(12) United States Patent
Kamisuki et al.

(10) Patent No.: US 7,055,236 B2
(45) Date of Patent: Jun. 6, 2006

(54) JOINING METHOD FOR HIGH-PURITY CERAMIC PARTS

(75) Inventors: Yoichi Kamisuki, Kanagawa (JP); Satohiro Enomoto, Hyogo (JP); Naoshi Irisawa, Hyogo (JP)

(73) Assignee: Asahi Glass Company, Limited, Tokyo (JP)

( * ) Notice: Subject to any disclaimer, the term of this patent is extended or adjusted under 35 U.S.C. 154(b) by 41 days.

(21) Appl. No.: 10/260,401

(22) Filed: Oct. 1, 2002

(65) Prior Publication Data

US 2003/0035891 A1    Feb. 20, 2003

Related U.S. Application Data

(63) Continuation of application No. PCT/JP01/00724, filed on Feb. 1, 2001.

(51) Int. Cl.
*B23P 25/00* (2006.01)

(52) U.S. Cl. ................ 29/458; 29/527.2; 428/446; 427/249.15; 427/255.18

(58) Field of Classification Search ............... 29/458, 29/527.2; 428/446; 427/249.15, 249.16, 427/255.18, 255.27, FOR. 100, FOR. 101
See application file for complete search history.

(56) References Cited

U.S. PATENT DOCUMENTS

| | | | |
|---|---|---|---|
| 4,514,240 A | | 4/1985 | Heraud |
| 4,697,325 A | * | 10/1987 | Kamigaito et al. ............ 29/447 |
| 4,923,716 A | * | 5/1990 | Brown et al. ........... 427/249.15 |
| 5,213,877 A | * | 5/1993 | Yoshida et al. ............. 428/209 |
| 5,942,454 A | | 8/1999 | Nakayama et al. |
| 6,165,301 A | * | 12/2000 | Henager et al. ......... 156/89.11 |
| 6,268,061 B1 | | 7/2001 | Tanino |
| 6,277,493 B1 | * | 8/2001 | Henager et al. ............ 428/446 |
| 6,436,361 B1 | | 8/2002 | Kamisuki et al. |

FOREIGN PATENT DOCUMENTS

| | | | |
|---|---|---|---|
| EP | 0 804 991 | | 11/1997 |
| JP | 48-66023 | | 9/1973 |
| JP | 59146985 A | * | 8/1984 |
| JP | 60237264 A | * | 11/1985 |
| JP | 61-136968 | | 6/1986 |
| JP | 61222961 A | * | 10/1986 |
| JP | 62-128974 | | 6/1987 |
| JP | 62-200722 | | 9/1987 |
| JP | 1-108171 | | 4/1989 |
| JP | 08337478 A | * | 12/1996 |
| JP | 11-228232 | | 8/1999 |
| JP | 2000-327459 | | 11/2000 |
| JP | 2001-48667 | | 2/2001 |

* cited by examiner

*Primary Examiner*—Jermie E. Cozart
(74) *Attorney, Agent, or Firm*—Oblon, Spivak, McClelland, Maier & Neustadt, P.C.

(57) ABSTRACT

A method for joining high-purity ceramic parts useful as parts for semi-conductor production apparatus, in particular, ceramic jigs used in the production of semi-conductors. Two related joining methods are described. First, high purity ceramic parts made of silicon carbide are placed in contact with each other and a layer of silicon carbide is coated around the two SiC pieces by chemical vapor deposition (CVD). This vapor deposited coating serves to bind the parts tightly together. In a second procedure, the ceramic elements are placed next to each other at a spaced distance, preferably from 10–1,000 um. The space between the two ceramic elements is filled with SiC using a vapor deposition (CVD) technique. The resultant structure is such that the outer layers of the ceramic elements are continuously integrated with each other via SiC the ceramic material vapor deposited in the space. Combinations of the first and second procedures are taught.

9 Claims, 4 Drawing Sheets

JOINING METHOD FOR HIGH-PURITY CERAMIC PARTS

TECHNICAL FIELD

The present invention relates to a joining method for high-purity ceramic parts, to be used mainly for a jig for the production of semiconductors, such as a jig for a wafer boat or a plasma etcher device, particularly to a joining method for high-purity ceramic parts made of silicon carbide.

BACKGROUND ART

Various ceramics are used for jigs for semiconductor production apparatus for an oxidation diffusion process, a CVD (hereinafter sometimes referred to also as chemical vapor deposition) process, or, in recent years, a plasma etching process. Among them, ceramics made of silicon carbide (hereinafter referred to as SiC ceramics) are widely used as parts for semiconductor production apparatus, since they are materials excellent in thermal conductivity, heat resistance and acid resistance.

For ceramic products for semiconductor production apparatus, a complex shape or a large size shape may be required in many cases. However, ceramics including SiC ceramics, are usually hardly processable. It is difficult in many cases to produce e.g. a sintered body of a complex shape by unified processing, and also with respect to a large size shape, it is impossible in many cases to produce such a product from a restriction of the production facility such as a calcination furnace.

Accordingly, it is common to divide a desired product into a plurality of parts (hereinafter referred to also as elements) and to join the respective parts to obtain a final product (a joined product).

Heretofore, as a common joining method for ceramic parts, joining by means of a binder in a state prior to calcination, or joining by means of an organic or inorganic binder after calcination, has been, for example, known. However, the joining by means of a binder prior to calcination has had a problem that it is cumbersome, and no correction is feasible after calcination. On the other hand, the joining by means of a binder after calcination has had a serious problem that it is inferior in strength or air tightness, and the purity tends to deteriorate. Further, by such a conventional joining method, it has been difficult to mend a broken product.

Further, JP-A-10-87376 proposes a method wherein SiC parts having male and female joining portions, are combined, so that a gap formed by the joining portions, is continuous, and molten Si is filled and solidified in the gap for joining. However, there has been a problem with respect to the heat resistance and acid resistance of the Si portion which fills the gap.

On the other hand, JP-A-9-249455 proposes a method wherein carbon parts are assembled, they are joined by means of a thermosetting resin adhesive containing carbon particles, to obtain a joined body, then the joined body including the adhesive portion, is converted to SiC, and further, on its surface, a SiC coating film is formed by a chemical vapor deposition method. However, this method employs a resin adhesive, whereby the strength of the joint portion tends to be weak, and there has been a problem that since carbon parts are used as the starting members, the method includes many steps and requires cumbersomeness.

Further, JP-A-9-107024 proposes that at the time of producing a graphite product having a SiC coating film formed, graphite products are joined by bringing them in close contact by face-to-face contact, and then a SiC coating film is formed by a chemical vapor deposition method. However, as the substrate parts, graphite having low strength is used, and it is difficult to firmly adhere them by face-to-face contact. Further, it is also proposed to fill a gap between joining surfaces with a sealing material made of a high temperature adhesive, followed by heat treatment for carbonization to secure the adhesion. However, fundamentally, graphite or the like as the substrates and the SiC coating film are different in the thermal expansion coefficients, and it is difficult to always maintain the adhesion.

Namely, heretofore, it has been difficult to find a joining method whereby high-purity ceramic parts can be joined simply without lowering the purity, yet, the obtainable joined body is excellent in high temperature strength, heat resistance and corrosion resistance, and it is applicable also to a complex shape.

DISCLOSURE OF THE INVENTION

The present invention provides a joining method for high-purity ceramic parts, which comprises disposing a plurality of ceramic parts to be joined, so that the respective desired joining portions are close to each other, and forming a SiC-fixed coating layer on the surface of the ceramic parts to be joined, by a chemical vapor deposition method, to join the ceramic parts to be joined (hereinafter referred to as the present joining method).

Embodiments of the present joining method may generally be classified into a case where the respective desired joining portions are disposed to be in close contact with each other and a case where the respective desired joining portions are disposed to have a gap formed therebetween.

MEANINGS OF SYMBOLS

Figure 1:
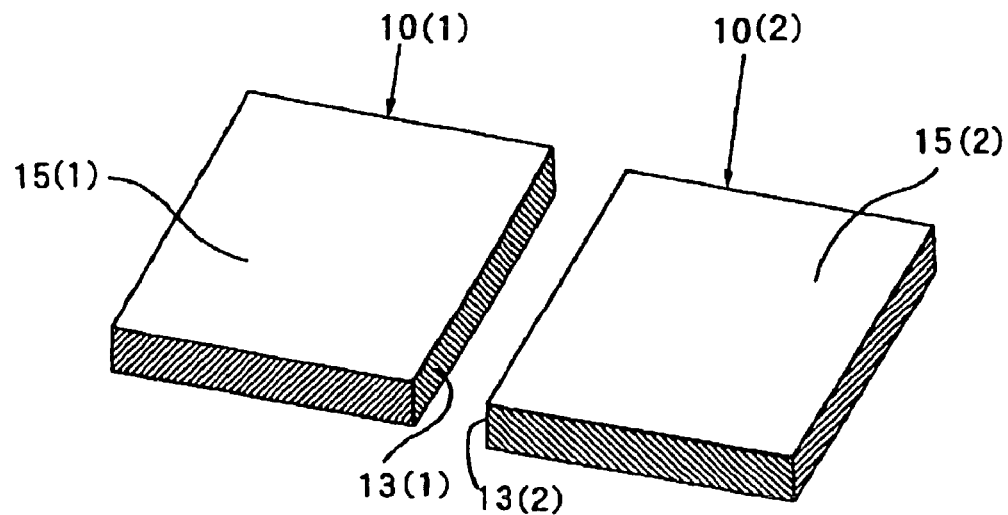
FIG. 1 is a perspective view showing high-purity ceramic parts to be joined.

10(1), 10(2): plate-shaped part, 13(1), 13(2): side face, 15(1), 15(2): surface portion, 20, 20': assembly of parts, 23, 23': SiC-fixed coating layer (outer shell), 30, 30': joined body, 200, 200': assembly of parts, 230, 230': SiC-fixed coating layer (outer shell), 230d: SiC-filled body, 300, 300': joined body, d: surface-to-surface distance of joining portions, e: upper opening, e': lower opening

BEST MODE FOR CARRYING OUT THE INVENTION

Now, the present invention will be described in detail.

As the high-purity ceramic parts to which the present joining method is applicable, metal silicon, quartz glass, etc. can be used in addition to non-oxide type ceramics and oxide type ceramics. As the ceramics, silicon carbide, silicon, silicon nitride, titanium carbide, aluminum nitride, alumina, zirconia, quartz, mullite and sialon, may, for example, be mentioned. Further, in the present specification, the high-purity ceramics are meant for those wherein impurities are not more than 0.1%.

Such ceramics may be composite. For example, one ceramics may constitute a matrix, and a fibrous or particulate filler of another ceramics may be dispersed in the matrix to form a reinforced body.

Further, these ceramics may be porous, and such pores may be filled with another ceramics. For example, Si-impregnated SiC made to be dense and gas permeable by impregnating a porous SiC sintered body with molten metal Si to completely fill the pores with Si, may be mentioned as a preferred example.

Further, high-purity ceramic parts made of silicon carbide formed by a chemical vapor deposition method are particularly preferred as parts for a semiconductor production apparatus, since the content of metal impurities is thereby small.

The joining method of the present invention is a method for joining parts formed by such ceramics, but the shape of the parts is not particularly limited. The basic shape may, for example, be a columnar shape, a rod shape, a cylindrical shape, a plate shape, a sheet shape, a film shape, a square rod shape, a flat plate shape, a conical shape, a pyramid shape or a spherical shape. Such joining may be carried out not only between parts of the same shape, e.g. between plate-shaped parts, but also between parts having different shapes. For example, it may be carried out between a plate-shaped part and a rod-shaped part, or between a plate-shaped part and a sheet-shaped part. In this specification, high-purity ceramic parts to be joined, will be referred to as ceramic parts to be joined, and "joining" means to finally unify a plurality of ceramic parts to be joined.

These parts are usually obtained by molding the starting material powder of ceramics by a desired mold, followed by sintering. However, in a case where the shape of the parts is a plate shape, a sheet shape of a film shape, they may be formed by a chemical vapor deposition method.

Now, embodiments of the present invention will be described with reference to the drawings. The present joining method is one wherein a plurality of ceramic parts to be joined are disposed so that the respective joining portions are close to each other, and generally, there are two embodiments. Namely, there are a case wherein the respective bonding portions are brought to be close until they are in contact with each other and a case where they are brought to be close to have a gap formed therebetween.

Firstly, the case wherein the bonding portions are disposed to be in contact with each other (hereinafter referred to simply as contact disposition), will be described. In the case of the contact disposition, a plurality of ceramic parts to be joined will be disposed and assembled so that the joining portions are in contact with each other, whereby an assembly of parts will firstly be constituted.

Here, let us consider a case where as the high-purity ceramic parts, two plate-shaped parts 10(1) and 10(2) as shown in FIG. 1, are to be joined at their side faces 13(1) and 13(2) or at their surface portions 15(1) and 15(2).

Firstly, joining at the side faces will be considered.

Figure 2:
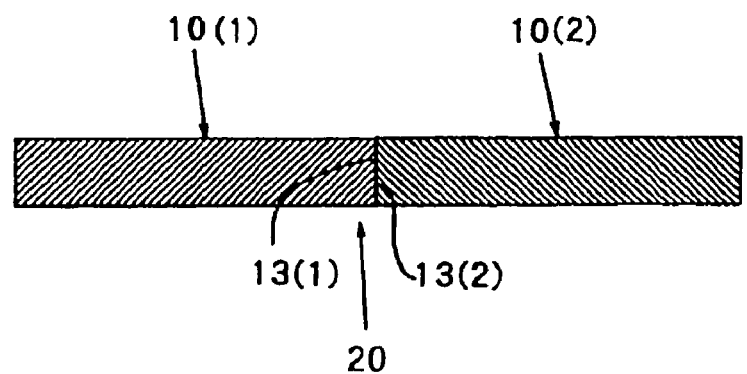
FIG. 2 is a longitudinal sectional view showing a state where high-purity ceramic parts are joined with their side faces being in contact with each other.

As the joining portions, the side faces 13(1) and 13(2) are assembled to secure close contact of their surfaces, whereby an assembly 20 is constituted as shown in FIG. 2.

In order to make the contact of the joining portions to be sufficient, it is preferred that the two will be in contact with each other by face-to-face contact, and it is preferred that both side faces are basically in parallel with each other and free from warping or the like, and their surfaces overlap each other without any space, whereby a firmly joined assembly 20 can be formed.

Further, it is preferred that both surfaces are well polished, so that the average surface roughness Ra thereof is at most 1 µm, preferably at most 0.5 µm, and the maximum surface roughness Rmax is at most 3 µm, preferably 1.5 µm. It is more preferred that the average surface roughness Ra is at most 1 µm, and the maximum surface roughness Rmax is at most 3 µm. Here, the average surface roughness Ra and the maximum surface roughness Rmax can be measured by means of an electron type surface roughness meter in accordance with e.g. JIS B-0601.

It is more preferred that the surfaces of the joining portions are planished to secure adequate smoothness and planarization, whereby the contact of the surfaces of the joining portions will be further improved.

Figure 3:
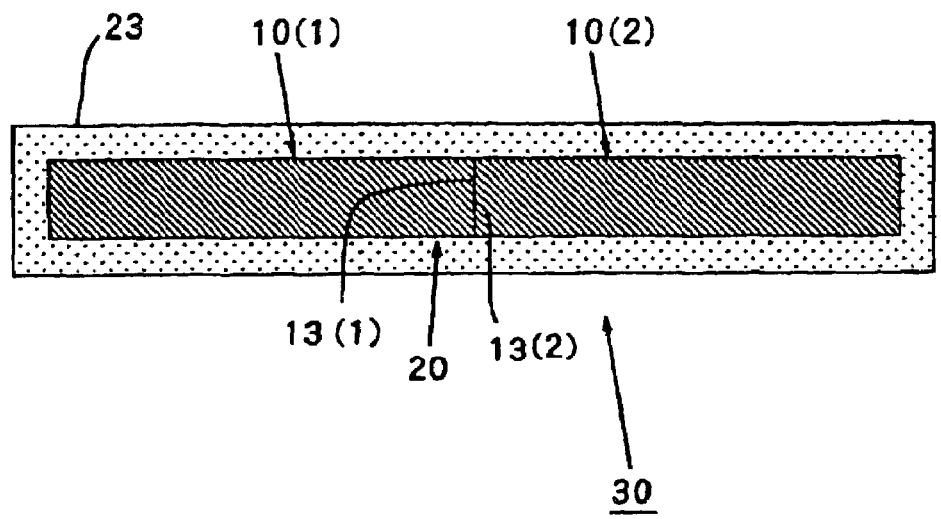
FIG. 3 is a longitudinal sectional view showing a state where a CVD-SiC-fixed coating layer is formed on the surface of the assembly.

Then, in the case of the contact disposition, as shown in FIG. 3, a fixed coating layer 23 of SiC by a chemical vapor deposition method (hereinafter referred to as CVD-SiC) is formed on the surface of the assembly 20 of the parts. Namely, the SiC coating film having high hardness will be a highly hard outer shell covering the entire outer surface of the assembly 20, whereby the internal assembly 20 is completely fixed by this outer shell to form a firm joined body 30 as a whole.

This joined body 30 is one having plate-shaped parts joined at their side faces to form a plate-shaped member having a constant thickness and a larger surface area.

On the other hand, joining of two plate-shaped parts 10 (1) and 10 (2) at their surface portions 15 (1) and 15 (2) can also be carried out in a similar manner. By such joining of the surfaces of the plate-shaped parts to each other, a ceramic laminate will be formed. This embodiment is one of important embodiments of the present invention.

Figure 4:
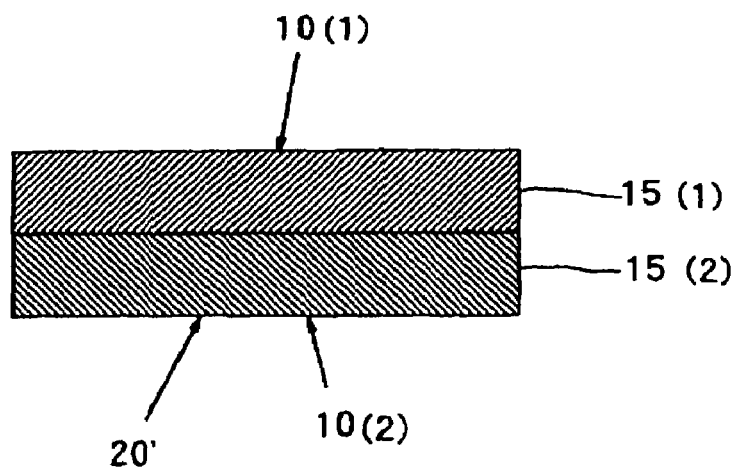
FIG. 4 is a longitudinal sectional view showing a state where high-purity ceramic parts are joined with their surface portions being in contact with each other.

As the joining portions, the surface portions 15 (1) and 15 (2) are overlaid and assembled so that their surfaces will be sufficiently in contact with each other, to constitute an assembly 20' of laminated parts, as shown in FIG. 4.

Like in the case of joining of the side faces, it is preferred that the two surfaces are in contact with each other by face-to-face contact. Namely, it is preferred that both surfaces are well polished, so that the average surface roughness Ra of the surfaces is at most 1 µm and/or the maximum surface roughness Rmax is at most 3 µm, whereby sufficient contact will be obtained. However, in the case of a laminate, the surface area to be contacted by face-to-face contact is large, and in order to let them contact over the entire surface, the higher the planarization and parallelization of the surfaces, the better.

Figure 5:
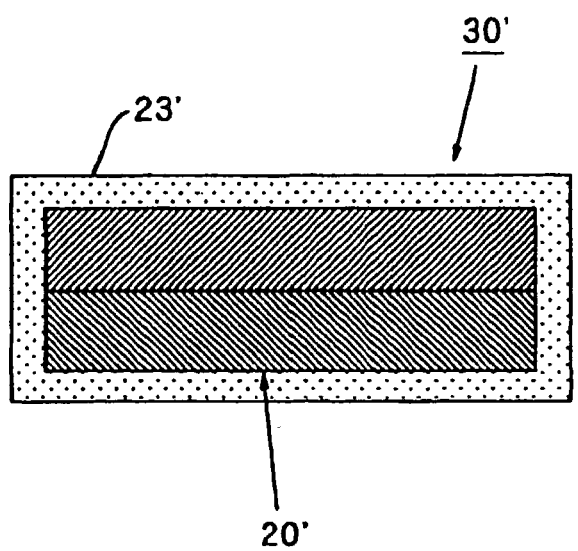
FIG. 5 is a longitudinal sectional view showing a state where a CVD-SiC-fixed coating layer is formed on the surface of the assembly.

In the same manner as in the case of joining the side faces, as shown in FIG. 5, a CVD-SiC-fixed coating layer 23' is formed on the surface of this assembly 20'. Thus, a SiC coating film having high hardness constitutes an outer shell covering the entire outer surface of this assembly, whereby the inner laminated assembly is completely fixed to form a firm joined body 30' as a whole.

In the present invention, the thickness of the SiC-fixed coating layer formed at the time of joining high-purity ceramic parts, is preferably from 20 to 2,000 µm, more preferably from 30 to 1,000 µm, still more preferably from 50 to 800 µm. With a film thickness thinner than this, no adequate strength or rigidity can be obtained. On the other hand, if the film thickness is too thick, it takes long time to form the film by a chemical vapor deposition method, whereby the productivity tends to be low, such being disadvantageous from the viewpoint of costs.

The assembly of high-purity ceramic parts is held by e.g. a jig for carbon or SiC ceramics and is placed in a CVD furnace, and a CVD-SiC film will be formed. This CVD-SiC film will be formed not only on the surface of the assembly but also on the surface of the jig, whereby when coating of the assembly with the CVD-SiC film, is carried out, the assembly tends to be joined also with the jig. Accordingly, such a jig is preferably removed from the joined body by sandblasting or cutting after joining high-purity ceramic parts.

Now, the case where the respective desired joining portions are disposed to have a gap formed therebetween (hereinafter referred to simply as the gap disposition), will be described. In the gap disposition, a plurality of high-purity ceramic parts to be joined, are assembled so that a surface-to-surface distance between the respective joining portions is maintained, whereby an assembly of parts having a gap, is constituted.

In the same manner as in the case of the contact disposition, let us consider a case where two ceramic plate-shaped parts 10 (1) and 10 (2) as shown in FIG. 1, are to be joined at their side faces 13 (1) and 13 (2) or at their surface portions 15 (1) and 15 (2).

Figure 6:
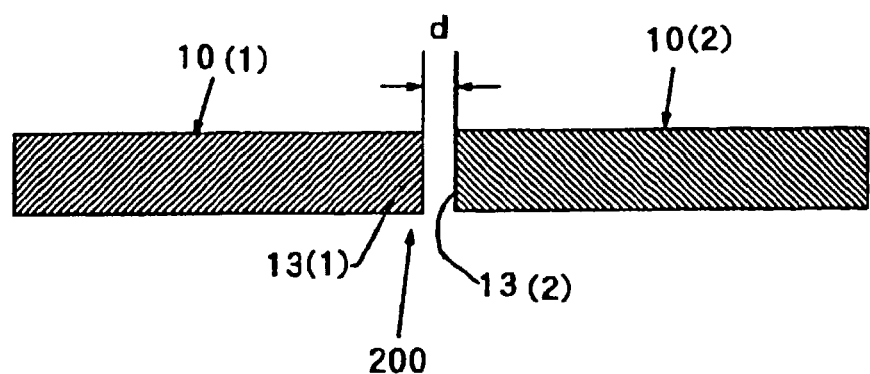
FIG. 6 is a longitudinal sectional view showing a state where high-purity ceramic parts are to be joined at their side faces with a gap kept therebetween.

Firstly, when joining at the side faces is considered, the side faces 13 (1) and 13 (2) being the joining portions, are assembled so that a distance (the surface-to-surface distance between a joining portions) d is maintained, as shown in FIG. 6, thereby to constitute an assembly 200 of parts.

The distance d is preferably from 10 to 1,000 µm. If the distance d is less than 10 µm, the starting material gas of CVD will not sufficiently enter into the space, and the strength at the joint portion will be weak, such being undesirable. On the other hand, if the distance d exceeds 1,000 µm, not only a large amount of the starting gas will be required to fill the space, but also the CVD time will be long, such being disadvantageous from the viewpoint of costs.

In the case of the gap disposition, the distance d is provided at the joining portions, and this distance is filled with CVD-SiC, whereby the joining portions will be bonded with higher strength.

Also in the case of the gap disposition, it is preferred that the surfaces of the joining portions are well polished, so that the average surface roughness Ra of the surfaces will be at most 1 µm, preferably at most 0.5 µm, and the maximum surface roughness Rmax will be at most 3 µm, preferably 1.5 µm, whereby the starting material gas is likely to enter uniformly, and the concentration distribution of the starting material gas will be uniform, whereby a void space tends to be hardly formed at the gap portion of a joined body, such being desirable. More preferably, the average surface roughness Ra is at most 1 µm, and the maximum surface roughness Rmax is at most 3 µm.

Figure 7:
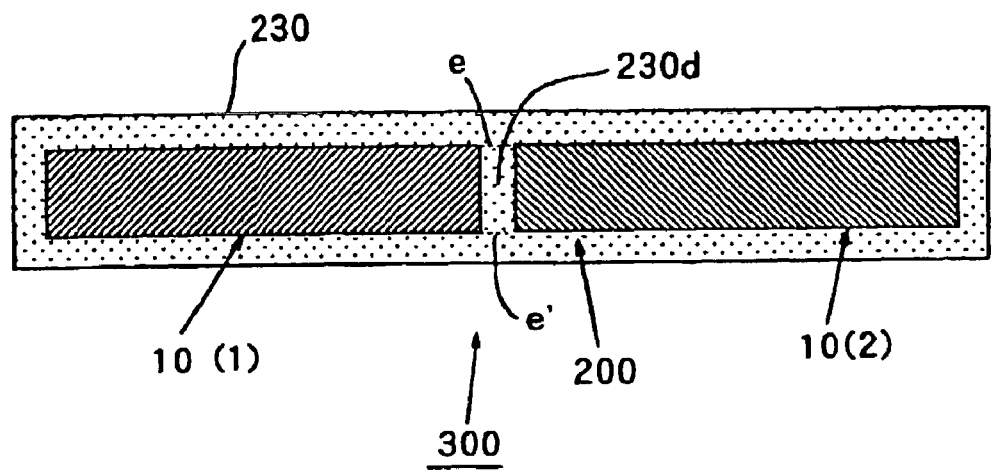
FIG. 7 is a longitudinal sectional view showing a state where a CVD-SiC-fixed coating layer is formed on the surface of the assembly.

Finally, a joined body as shown in FIG. 7, is obtained. Namely, a CVD-SiC-fixed coating layer 230 constitutes a highly hard outer shell to completely fix the ceramic plate-shaped parts 10 (1) and 10 (2), and the SiC portion (230*d*) filling the space d between the joining portions and this fixed coating layer 230 are continuous and integrated with each other at the upper opening e and the lower opening e'.

Figure 8:
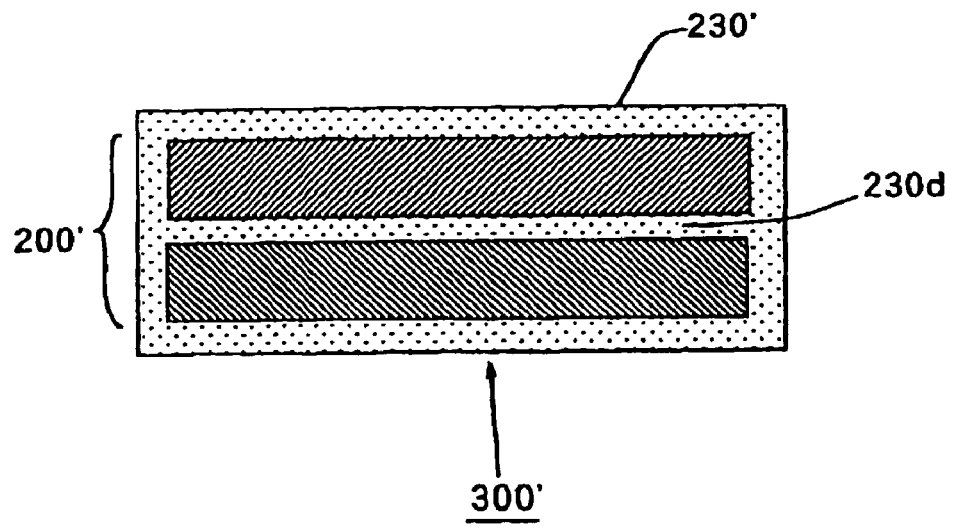
FIG. 8 is a longitudinal sectional view showing a state where a CVD-SiC-fixed coating layer is formed on the surface of the assembly.

In the same manner, it is possible to form a laminate (joined body) 300' as shown in FIG. 8, by joining plate-shaped parts at their surface portions.

In a case where parts are laminated with their surface portions spaced as shown in FIG. 8, it is preferred that the two are disposed to stand vertically to have the distance d maintained, or a spacer made of carbon or SiC is inserted between the surface portions to have the distance d maintained. Such a spacer may be permitted to remain in the joined body (in the SiC coating film) as the product, when there will be no substantial problem, or it may be removed from the joined body by sandblasting or cutting, as the case requires.

Further, in the present invention, joining of high-purity ceramic parts to each other can be made more certain by forming a protrusion (convex, male portion or ridge) on the surface of one of the parts to form a joined body and a recess (concave, female portion or groove) to receive the protrusion on the surface of the other part.

The assembly of high-purity ceramic parts thus disposed is held by e.g. a jig made of carbon or SiC ceramic and placed in a CVD furnace to form a CVD-SiC film, in the same manner as in the case of the contact disposition.

The CVD furnace to carry out the present invention is not particularly limited, but a horizontal type, a vertical type or a bell jar type may, for example, be preferably employed. Further, as a heating method, direct application of electricity, high frequency induction heating or laser heating may be employed.

The CVD-SiC film is, basically, deposited by introducing a starting material gas into a non-oxidizing atmosphere of from 1,000 to 1,600° C., preferably from 1,100 to 1,500° C.

The starting material gas may be (1) a starting material gas type wherein Si and C are supplied from different compounds, such as $SiCl_4$ and $CH_4$, $SiCl_4$ and $C_3H_8$, $SiCl_4$ and $C_6H_{14}$, $SiCl_4$ and $CCl_4$, or $Si_2H_6$ and $CH_4$, or (2) a starting material gas type wherein Si and C are supplied from the same compound, such as $CH_3SiCl_3$, $(CH_3)_2SiCl_2$, $(CH_3)_3SiCl$, $(CH_3)_4Si$ or $CH_3SiHCl_2$. Such a starting material gas is introduced into the furnace together with a carrier gas such as $H_2$, He or Ar.

The pressure at the time of forming the CVD-SiC film, is not particularly limited. However, it is preferably a reduced pressure of from about 1 to 300 Torr, preferably from about 10 to 100 Torr, in order to fill the gap substantially completely with SiC.

As already mentioned above, SiC of plate-shape, sheet-shape, film-shape or thin plate-shape may preliminarily be formed as a part to be joined, under the above-mentioned CVD conditions. Namely, in such a case, a graphite or carbon substrate is used as the substrate, and a SiC coating film having a desired thickness is formed thereon. The graphite, etc. of the substrate may later be removed by a means such as thermal decomposition at a temperature of about 1,000° C. in air, to obtain a thin plate-shaped SiC (CVD-SiC).

Further, when a joined body of high-purity ceramic parts, obtained by the present invention, is used as a jig for a semiconductor production apparatus, the high-purity ceramic parts to be joined, are preferably ones having little impurities, particularly ones in which the total amount of metal impurities is at most 40 ppm, preferably at most 30 ppm, more preferably at most 20 ppm, most preferably at most 10 ppm.

Here, metal impurities are Fe, Cu, Mg, V, Ni, Mn, Na, K, Al, etc., excluding Si, and they are hazardous elements which will be included in wafers and are likely to cause deterioration of the insulation resistance, deterioration of the withstand voltage of $SiO_2$, pn junction leak failure, etc., to semiconductor devices.

Further, the purity of the CVD-SiC coating layer to be formed on the surface of such high-purity ceramic parts, is preferably such that the total amount of metal elements is at most 50 ppb, preferably at most 30 ppb, more preferably at most 10 ppb.

EXAMPLES

Now, the present invention will be described in further detail with reference to Examples.

(1) Formation of an Assembly of High-Purity Ceramic Parts

Example 1

Firstly, two sheets of CVD-SiC wafer of 4×4 cm having a thickness of 1 mm and having a β-type crystal structure, as shown in FIG. 1, were prepared as ceramic parts to be joined. Here, the average surface roughness Ra of the CVD-SiC wafer was 0.2 μm, and the maximum surface roughness Rmax was 2.0 μm.

These parts were disposed to contact each other at their side faces, as shown in FIG. 2, by holding their both ends by means of a carbon jig (not shown). Namely, the two parts were contacted to form an assembly of parts, having a shape of 4 cm×8 cm×1 mm.

Example 2

Two sheets of the same CVD-SiC wafer as in Example 1, were prepared as ceramic parts to be joined. These parts were laminated and disposed with the surfaces of the two sheets being in contact with each other, as shown in FIG. 4.

Example 3

Two sheets of the same CVD-SiC wafer as in Example 1, were prepared. Then, by means of a carbon jig, the two sheets of wafer parts were disposed so that they formed a letter T.

Example 4

Two sheets of the same CVD-SiC wafer as in Example 1, were prepared. The two sheets of wafer were disposed so that the distance d between the side faces would be 500 μm, as shown in FIG. 6, to obtain an assembly.

Example 5

Two sheets of wafer were disposed in the same manner as in Example 1 except that Si-impregnated SiC wafers were used as high-purity ceramic parts. Here, the average surface roughness Ra of the Si-impregnated SiC wafers was 0.2 μm, and the maximum surface roughness Rmax was 2.2 μm.

(2) Formation of CVD-SiC Fixed Coating Layer

Then, the assemblies of high-purity ceramic parts disposed in Examples 1 to 5, were placed in a CVD furnace and heated at 1,000° C. in vacuum for baking treatment. Namely, in this state, $H_2$ gas was introduced, and the pressure was adjusted to 100 Torr and maintained for 60 minutes. Then, the temperature was raised at a rate of 15° C./min to a film forming temperature of 1,250° C.

Then, $CH_3SiCl_3$ was introduced as a starting material compound for forming a SiC-fixed coating layer, and a CVD-SiC fixed coating layer of 250 μm was formed on each of the surfaces of the high-purity ceramic parts.

Further, with respect to Examples 1 to 5, the concentrations of metal impurities on the surfaces were measured before and after joining. In Examples 1 to 4, the concentration was 40 ppb both before and after joining. In Example 5, it was 18 ppm before joining, and 45 ppb after joining.

Joined bodies having CVD-SiC fixed coating layers formed, were detached from carbon jigs, to obtain the respective SiC joined bodies. These joined bodies were subjected to tensile tests by an Instron tester, whereby the tensile strength was very high, and the strength of the joint portions was no less than other portions, and they were found to be joined bodies excellent also in purity and acid resistance.

Comparative Example 1

Two sheets of CVD-SiC wafer of 4×4 cm and having a thickness of 1 mm, were prepared in the same manner as in Example 1. Using as an adhesive, one having 65 mass % of a modified phenol resin and 35 mass % of scaly natural graphite powder kneaded, they were contacted in the same manner as in Example 1.

Then, they were heated in air at 200° C. to cure the adhesive, and further, the temperature was raised to 1,000° C. in a non-oxidizing atmosphere to carbonize the resin in the adhesive. In this manner, a SiC joined body was obtained. The thickness of the adhesive layer became 200 μm.

(3) Flexural Strength and Thermal Shock Resistance

Using the joined bodies obtained in Examples 1 and 4 and Comparative Example 1, evaluation of flexural strength and thermal shock resistance was carried out.

① Flexural Strength

Four point flexural strength of each SiC joined body at room temperature, was measured in accordance with the method prescribed in JIS R1601.

③ Thermal Shock Resistance

Evaluation of thermal shock resistance was carried out by a thermal shock method. The SiC joined body was heated and then quenched by dropping it into water, to give a temperature difference, whereby the change in strength of the SiC joined body was measured.

In Table 1, the value of the minimum temperature difference (thermal shock resistance temperature ΔT) where the change in strength became sharp, was shown together with the value of the flexural strength.

TABLE 1

|  | Flexural strength (MPa) | Heat shock resistance temperature ΔT (° C.) |
| --- | --- | --- |
| Ex. 1 | 250 | 450 |
| Ex. 4 | 290 | 450 |
| Comp. Ex. 1 | 150 | 300 |

INDUSTRIAL APPLICABILITY

According to the joining method for high-purity ceramic parts of the present invention, a ceramic joined body which has a complex shape or a large size shape and which has high strength, is excellent in heat resistance and acid resistance and has high purity, can be obtained simply as compared with the conventional joining method.

Especially when the high-purity ceramic parts are SiC parts made of CVD-SiC or Si-impregnated SiC, if a fixed coating layer is formed with CVD-SiC, the high-purity ceramic parts and the fixed coating layer will basically be SiC material having the same level of high purity, and a joined body which has high strength, is excellent in heat resistance and acid resistance and yet has a high level of purity, can be obtained.

Further, the joining method of the present invention can be applied to joining of high-purity ceramic parts of various sizes. For example, it can be applied to joining of small parts of a few mm to large parts exceeding 1 m.

According to the method of the present invention, it is possible to join high-purity ceramic parts of various shapes, and it is suitable for joining parts to each other, when a jig of a complex shape, such as a wafer boat, is to be produced. Thus, a ceramic joined body obtainable by the method of the present invention is suitably used as a jig for production of semiconductors, which is excellent in heat resistance and acid resistance and which has high strength and high purity.

Further, according to the joining method of the present invention, mending of e.g. a broken high-purity SiC jig, which used to be impossible by a conventional joining method, will be possible. Further, the method of the present invention may be used in the same manner for an application other than the process for producing semiconductors.

What is claimed is:

1. A joining method for high-purity ceramic parts, which comprises disposing a plurality of ceramic parts to be joined, so that the respective desired joining portions are close to each other in a desired orientation, and, and then forming a SiC-fixed coating layer on the the ceramic parts by a chemical vapor deposition method while in the desired orientation thereby joining, the ceramic parts.

2. The joining method for high-purity ceramic parts according to claim 1, wherein the respective desired joining portions are disposed to be in contact with each other.

3. The joining method for high-purity ceramic parts according to claim 1, wherein the respective desired joining portions are disposed to have a gap formed therebetween.

4. The joining method for high-purity ceramic parts according to claim 3, wherein the surface-to-surface distance at the gap is from 10 to 1,000 µm.

5. The joining method for high-purity ceramic parts according to claim 1, wherein the surface of the joining portions, has a surface average surface roughness Ra of at most 1 µm and a maximum surface roughness Rmax of at most 3 µm.

6. The joining method for high-purity ceramic parts according to claim 1, wherein the SiC-fixed coating layer has a thickness of from 20 to 2,000 µm.

7. The joining method for high-purity ceramic parts according to claim 1, wherein the high-purity ceramic parts are made of SiC.

8. The joining method for high-purity ceramic parts according to claim 7, wherein the high-purity ceramic parts are made of silicon carbide formed by a chemical vapor deposition method.

9. The joining method for high-purity ceramic parts according to claim 7, wherein the high-purity ceramic parts are made of SiC impregnated with Si.

* * * * *